United States Patent Office 3,634,557
Patented Jan. 11, 1972

---

3,634,557
OXIME THIOPHOSPHATES
Adolf Hubele, Riehen, Switzerland, assignor to
Ciba Limited, Basel, Switzerland
No Drawing. Filed July 10, 1968, Ser. No. 745,083
Claims priority, application Switzerland, July 14, 1967,
10,109/67
Int. Cl. C07f 9/06; A01n 9/36
U.S. Cl. 260—944       6 Claims

ABSTRACT OF THE DISCLOSURE

Oxime thiophosphates and pesticides containing them are disclosed. The active components correspond to the formula

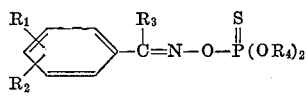

wherein $R_1$ and $R_2$ are identical or different and denote hydrogen or substituents of the first or second order, $R_3$ is an alkyl radical and $R_4$ is methyl or ethyl.

---

The present invention relates to pesticides which as the active component contain at least one oxime-phosphate of general formula

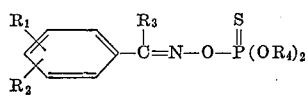
(I)

wherein $R_1$ and $R_2$ may be identical or different and denote hydrogen, halogen, lower alkyl, alkoxy, alkylthio, alkylsulphinyl or alkylsulphonyl residues, —$NO_2$, —CN, —$CF_3$, —SCN or —COO alkyl, $R_3$ denotes an alkyl residue having 1 to 12 C atoms, preferably an alkyl residue having 1–4 C atoms and $R_4$ denotes methyl or ethyl, as well as furthermore optionally also one or more of the following additives: solvents, dispersing agents, wetting agents, adhesives, binders and/or fertilisers as well as furthermore also further known pesticides.

The active substances defined by the general Formula I show a strong lethal action against various species of the order acarina (ticks, spinning mites and the like) and indeed show an action both against eggs and also against adults. They furthermore show a strong lethal action on various species of insects and their larvae stages such as Orgya, Lymantria, Gastroydia and the like.

The active substances of Formula I also show a strong lethal action against plant-pathogenic micro-organisms such as bacteria and fungi, for example *Alternaria solani*, *Septoria apii* and the like. Furthermore an action against nematodes, molluscs such as gastropodes, algae and other water pests was observed for the active substances of Formula I. The active substances of formula

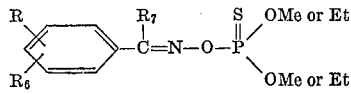

wherein $R_5$ and $R_6$ may be identical or different and denote hydrogen, halogen, lower alkyl, alkoxy or alkylthio residues, —$NO_2$, —CN, —$CF_3$, —SCN or —COO alkyl ($C_{1-4}$) groups and $R_7$ represents an alkyl residue having up to 4 carbon atoms are distinguished by a particularly high activity.

The new materials may be used in the most diverse manner, for example as dusting agents, emulsions, flypapers and fly plates, in animal dips and the like.

Possible materials for the manufacture of directly sprayable solutions of the compounds of general Formula I are for example mineral oil fractions of high to medium boiling range, such as diesel oil or kerosene, coal tar oil and oils of vegetable or animal origin, as well as hydrocarbons such as alkylated naphthalenes, or tetrahydronaphthalene, optionally with the use of xylene mixtures, cyclohexanols, ketones, and also chlorinated hydrocarbons such as trichloroethane, trichlorethylene or trichlorobenzenes and tetrachlorobenzenes. It is advantageous to use organic solvents whose boiling point is above 100° C.

Aqueous application forms are particularly appropriately manufactured from emulsion concentrates, pastes or wettable spraying powders by adding water. Possible emulsifiers or dispersing agents are non-ionic products, for example condensation products of aliphatic alcohols, amines or carboxylic acids having a long chain hydrocarbon residue of about 10 to 20 carbon atoms with ethylene oxide, such as the condensation product of octadecyl alcohol and 25 to 30 mols of ethylene oxide or that of soya fatty acid and 30 mols of ethylene oxide or that of technicaloleylamine and 15 mols of ethylene oxide or that of dodecylmercaptan and 12 mols of ethylene oxide. Amongst the anionic emulsifiers which may be employed there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids or the sodium salt of a petroleum-sulphonic acid. Possible cationic dispersing agents are quaternary ammonium compounds such as cetylpyridinium bromide or dihydroxyethylbenzyldodecylammonium chloride.

In order to manufacture dusting and scattering agents, it is possible to employ talc, kaolin, bentonite, calcium carbonate, but also charcoal, cork powder, wood flour and other materials of vegetable origin as solid carriers. It is also very appropriate to manufacture the preparations in a granular form. The various application forms may in the usual manner be provided with addition of substances which improve the distribution, the adhesion, the rain resistance or the penetrating power; as such substances there may be mentioned: fatty acids, resins, glue, casein or alginates.

The materials according to the invention may be used by themselves or together with conventional pesticides, especially insecticides, acaricides, nematocides, bactericides or further fungicides. The oxime-phosphates of Formula I or II have hitherto not yet been described in the literature.

The present invention therefore relates to the new oxime-phosphates of general Formula I

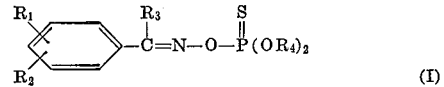
(I)

wherein $R_1$ and $R_2$ may be identical or different and denote hydrogen, halogen, lower alkyl, alkoxy or alkylthio residues, —$NO_2$, —CN, —$CF_3$, —SCN or —COO alkyl groups, $R_3$ denotes an alkyl residue having 1 to 12 C atoms, preferably an alkyl residue having 1–4 C atoms and $R_4$ denotes methyl or ethyl.

In particular, the invention relates to an oxime-phosphates of general Formula II

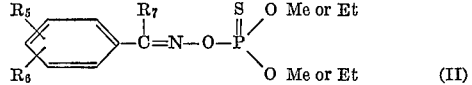
(II)

wherein $R_5$ and $R_6$ may be identical or different and denotes hydrogen, halogen, lower alkyl, alkoxy or alkylthio, alkylsulphinyl or alkylsulphonyl residues, —NO$_2$, —CN, —CF$_3$, —SCN or —COO alkyl(1–4 C) groups and R$_7$ represents an alkyl residue having 1 to 4 carbon atoms.

In particular, the invention relates to an oxime-phosphate of formula

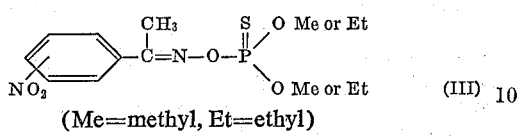

(Me=methyl, Et=ethyl)

wherein the nitro group is in the m-position or p-position relative to the other substituents. Such oxime-phosphates are throughout distinguished by a high activity against representatives of the order acarina (ticks, spinning mites and the like) and by an extremely low toxicity which in the case of rats (LD$_{50}$ p.o.) is about 3000 mg./kg. or more.

The present invention also relates to the manufacture of the oxime-phosphates of Formula I which is characterised in that a compound of formula

wherein Hal denotes a halogen atom—preferably chlorine or bromine—is reacted with an oxime of formula

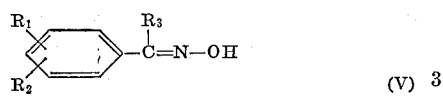

or a salt thereof.

An alkali salt is preferably used as the salt of an oxime of Formula V.

The reaction is appropriately carried out in the presence of an inert solvent such as petroleum ether, benzene, toluene, cyclohexane, a ketone and the like.

EXAMPLE 1

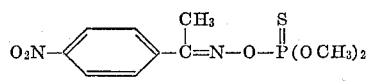

180 parts of 4-nitro-acetophenone are dissolved in 500 parts by volume of ethanol, 100 parts by volume of water and 40 parts of sodium hydroxide and the water and ethanol are evaporated. The sodium salt of the oxime is suspended in 400 parts by volume of methyl ethyl ketone and is added dropwise over the course of 1 hour, whilst stirring, to 166 parts of O,O-dimethylthionophosphoric acid ester chloride. After 3 hours the reaction mixture is poured into water, taken up in benzene, washed with 2 N sodium hydroxide solution and water and dried over sodium sulphate. Thereafter the solvent is distilled off and the product recrystallised from the ethanol-petroleum ether (50–70° C.).

Melting point: 70–71° C. [Compound No. 1].

The following oxime-phosphates may furthermore be manufactured in the same manner as described in Example 1:

| Compound No. | Constitution | Melting point |
| --- | --- | --- |
| 2 | (phenyl with NO$_2$)—C(CH$_3$)=N—O—P(S)(OCH$_3$)$_2$ | 54–55° C. |
| 3 | (Cl,Cl-phenyl)—C(CH$_3$)=N—O—P(S)(OCH$_3$)$_2$ | 58–60° C. |
| 4 | (Cl,Cl-phenyl)—C(CH$_3$)=N—O—P(S)(OC$_2$H$_5$)$_2$ | Light yellow oil. |
| 5 | O$_2$N—(phenyl)—C(CH$_3$)=N—O—P(S)(OC$_2$H$_5$)$_2$ | 47–48° C. |
| 6 | I—(phenyl)—C(CH$_3$)=N—O—P(S)(OCH$_3$)$_2$ | 63–65° C. |
| 7 | CH$_3$—(phenyl with NO$_2$)—C(CH$_3$)=N—O—P(S)(OCH$_3$)$_2$ | 48–49° C. |
| 8 | CH$_3$—(phenyl)—C(CH$_3$)=N—O—P(S)(OCH$_3$)$_2$ | 59–60° C. |
| 9 | CH$_3$—(phenyl)—C((CH$_2$)$_7$CH$_3$)=N—O—P(S)(OCH$_3$)$_2$ | Light yellow oil. |
| 10 | CH$_3$O—(phenyl)—C(CH$_3$)=N—O—P(S)(OCH$_3$)$_2$ | Do. |
| 11 | (Cl, OCH$_3$, Cl-phenyl)—C(CH$_3$)=N—O—P(S)(OCH$_3$)$_2$ | Do. |

| Compound No. | Constitution | Melting point |
|---|---|---|
| 12 | ![structure: 2-Cl, 4-CH3, 6-OCH3 phenyl-C(CH3)=N-O-P(S)(OCH3)2] | Do. |
| 13 | ![structure: 2-CH3, 4-CH3, 5-I phenyl-C(CH3)=N-O-P(S)(OCH3)2] | Do. |
| 14 | ![structure: 3-NO2, 4-CH3 phenyl-C(CH3)=N-O-P(S)(OC2H5)2] | Do. |
| 15 | ![structure: 4-I phenyl-C(CH3)=N-O-P(S)(OC2H5)2] | Do. |

Furthermore the following oxime-thiophosphates may be manufactured:

| Compound No. | |
|---|---|
| 16 | SCN-phenyl(o-SCN)-C(CH3)=N-O-P(S)(OCH3)2 |
| 17 | NCS-phenyl-C(CH2CH3)=N-O-P(S)(OC2H5)2 |
| 18 | CN-phenyl(o-CN)-C(CH3)=N-O-P(S)(OCH3)2 |
| 19 | NC-phenyl-C((CH2)2CH3)=N-O-P(S)(OCH3)2 |
| 20 | F3C-phenyl-C(CH3)=N-O-P(S)(OC2H5)2 |
| 21 | CH3S-phenyl-C(CH2CH3)=N-O-P(S)(OCH3)2 |
| 22 | CH3S-phenyl-C((CH2)2CH3)=N-O-P(S)(OC2H5)2 |
| 23 | CH3SO2-phenyl-C(CH3)=N-O-P(S)(OCH3)2 |
| 24 | CH3SO2-phenyl-C(CH3)=N-O-P(S)(OC2H5)2 |
| 25 | CH3SO2-phenyl-C((CH2)3)=N-O-P(S)(OCH3)2 |

The following may furthermore be used as reaction components: m- and p-nitro-propiophenone-oxime, p-iodo-propiophenone-oxime, 3,4-dichloro-propiophenone-oxime, m- or p-nitro-butyrophenone-oxime, p-iodo-butyrophenone-oxime and O,O-dimethyl- or O,O-diethyl-thiophosphoryl chloride and hte like.

EXAMPLE 2

2 parts of the active substance of Example 1 are sprayed onto 98 parts of kaolin and the whole is ground to give a homogeneous dust.

EXAMPLE 3 (Wettable powder)

25 parts of the active substance of Example 1 are sprayed onto 73 parts of kieselguhr and thereafter the whole is ground with 2 parts of naphthalenesulphonic acid to give a homogeneous mass. Water is added to this mass until the desired concentration of active substance is reached.

EXAMPLE 4 (Emulsion)

20 parts of the active substance of Example 1 are dissolved in 75 parts of xylene and 5 parts of castor oil butyl ester sulphonate are added.

The solution thus obtained is suspended in an amount of water such that the desired concentration of active substance is obtained.

EXAMPLE 5

40 g. of the active substance of Example 1 are taken up in 60 cc. of a 25% strength solution of a mixture of equal parts of a condensation product of tert.octoylphenyl with about 10 mols of ethylene oxide and of calcium dodecylbenzene-sulphonate in xylene and the whole is made up to 100 cc. with xylene. An emulsion concentrate is thus obtained which can be diluted with water as desired and which forms stable emulsions.

EXAMPLE 6

The active substance No. 1 was processed into a concentrate which contained 30% of the compound to be tested, 60% of xylene as a solvent and 10% of a commercially available non-ionic emulsifier of the p-tert.octylphenylpolyethylene glycol type.

A spraying emulsion was manufactured by diluting 0.1 cc. of the concentrate to 100 cc. with water; a concentration of 0.03% of the active substance No. 1 in the spraying emulsion was thus obtained.

Bush bean plants in the two-leaf stage are infested with spinning mites, by placing attacked pieces of leaf from the culture on them, 24 hours before treatment with the active substance. The treatment of the infested experimental plant are effected by spraying the emulsified active substances with the aid of a chromatography atomiser. After 2 days the plants are inspected by means of binoculars and the percentages killed are calculated. The action of various active substances is given in the table which follows:

ACTIVE SUBSTANCE NO. 2—ACTION AGAINST SPINNING MITES (a) *Tetranychus urticae*

| Concentration in p.p.m. | Deaths in percent | | | | Eggs, 7 days |
|---|---|---|---|---|---|
| | Adults | | Larvae | | |
| | 2 days | 7 days | 2 days | 7 days | |
| 800 | 100 | 100 | 100 | 100 | 0 |
| 400 | 100 | 100 | 100 | 100 | 0 |
| 200 | 100 | 100 | 100 | 100 | 0 |

(b) *Tetranychus telarius* (resistant to phosphorus esters)

| 800 | 100 | 100 | 100 | 100 | 0 |
|---|---|---|---|---|---|
| 400 | 100 | 100 | 100 | 100 | 60 |
| 200 | 100 | 100 | 100 | 100 | 0 |

ACTIVE SUBSTANCE NO. 1

(a) *Tetranychus urticae*

| Concentration in p.p.m. | Deaths in percent | | | | Eggs, 7 days |
|---|---|---|---|---|---|
| | Adults | | Larvae | | |
| | 2 days | 7 days | 2 days | 7 days | |
| 800 | 100 | 100 | 100 | 100 | 80 |
| 400 | 100 | 100 | 100 | 100 | 60 |
| 200 | 100 | 100 | 100 | 80 | 0 |
| 100 | 100 | 100 | 100 | 80 | 0 |

(b) *Tetranychus telarius*

| 800 | 100 | 100 | 100 | 100 | 100 |
|---|---|---|---|---|---|
| 400 | 100 | 100 | 100 | 80 | 80 |
| 200 | 100 | 100 | 100 | 60 | 60 |
| 100 | 80 | 100 | 100 | 0 | 0 |

A practically identical result was achieved with active substances Nos. 3, 4, 5, 7, and 10.

The active substances Nos. 10 and 14 at low concentrations showed a telling lethal success against *Rhipicephalus bursa*.

EXAMPLE 7

Active substance No. 2, in a dilution of 0.2%, shows an 80% protective action against *Alternaria solani* infections and a 72% protective effect against *Septoria apii* infections.

EXAMPLE 8

Active substances Nos. 6, 8, 10, 11 and 12, in high dilution, show a good lethal action against the cotton pest boll weevil.

EXAMPLE 9

Active substance No. 14, at a concentration of 800 p.p.m., showed 80% deaths after 2 days, and 100% deaths after 5days, when used against *Orgya gonostigma*. The same active substance at the same concentration showed 80% deaths after 2 days and 100% deaths after 5 days when used against *Epilachra varivestis*.

The other active substances Nos. 1 to 15 behaved similarly.

Active substance No. 13, used in a contact experiment against *Musca domestica*, at a concentration of 1000 p.p.m., showed 100% deaths after 15 minutes and 30 minutes, and again 100% deaths after 100 p.p.m. after 30 minutes.

The other active substances Nos. 1 to 15 showed similar figures.

Active substance No. 13, used against *Calandra granatia*, showed 100% of the insects lying on their backs after 4 hours exposure time at 1000 p.p.m. and 100 p.p.m.

EXAMPLE 10

The extremely low toxicity of the active substance to warm-blooded animals is striking.

Thus for example the following active substances, when perorally applied to rats, showed the following $LD_{50}$ values:

Active Substance No.                $LD_{50}$ mg./kg.
1 _____ greater than 3000.
2 _____ greater than 3000.
5 _____ 2620±370.
7 _____ 9000.

The other active substances showed toxicities of the same order of magnitude.

I claim:

1. Oxime thiophosphates of the formula

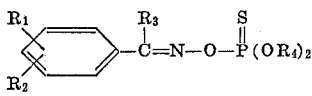

wherein $R_1$ and $R_2$ may be identical or different and denote hydrogen, chlorine, iodine, methyl, methoxy, methylthio, methylsulfonyl, $CH_3S$—, —$NO_2$, —CN, or $CF_3$, or $R_3$ denotes an alkyl residue of 1 to 8 C atoms and $R_4$ denotes methyl or ethyl provided that when $R_1$ is chlorine $R_2$ is other than hydrogen.

2. Compounds according to claim 1 wherein $R_1$ is —$NO_2$ and $R_2$ is hydrogen.

3. Compounds according to claim 1 wherein $R_3$ is methyl.

4. Compounds according to claim 1 wherein $R_4$ is methyl.

5. A compound according to claim 2 having the formula

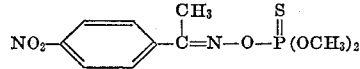

6. A compound according to claim 2 having the formula

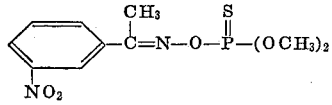

References Cited

UNITED STATES PATENTS 2,957,016    10/1960    Diamond _____ 260—944

CHARLES B. PARKER, Primary Examiner

A. H. SUTTO, Assistant Examiner

U.S. Cl. X.R.

71—87; 260—454, 940, 972; 424—210, 211